United States Patent [19]

Ginn

[11] 4,390,825
[45] Jun. 28, 1983

[54] AUTO-THRESHOLD SLOW START CONTROL CIRCUIT FOR A CENTRIFUGE

[75] Inventor: David W. Ginn, Newtown, Conn.

[73] Assignee: E. I. Du Pont de Nemours & Co., Wilmington, Del.

[21] Appl. No.: 277,875

[22] Filed: Jun. 26, 1981

[51] Int. Cl.³ .............................................. H02P 5/16
[52] U.S. Cl. .................................... 318/384; 318/390; 318/431
[58] Field of Search ........................... 318/384–385, 318/390–391, 393, 395, 301, 312–313, 315, 317, 344, 345 A, 345 C, 310, 615, 617, 628, 430, 431; 233/8

[56] References Cited

U.S. PATENT DOCUMENTS

| | | | |
|---|---|---|---|
| 3,914,671 | 10/1975 | Morton et al. | 318/431 |
| 3,970,245 | 7/1976 | Aeschlimann | 233/8 |
| 4,297,623 | 10/1981 | Dupont | 318/301 |
| 4,300,079 | 11/1981 | Kawada et al. | 318/390 |
| 4,339,697 | 7/1982 | Franz | 318/345 C |

FOREIGN PATENT DOCUMENTS

| | | |
|---|---|---|
| 1502594 | 1/1971 | United Kingdom . |
| 529847 | 2/1974 | U.S.S.R. . |

*Primary Examiner*—J. V. Truhe
*Assistant Examiner*—A. Evans

[57] ABSTRACT

This invention relates to a slow start control network which includes a field effect transistor triggered by the voltage across a charging capacitor. The field effect transistor permits current flow through a portion of an associated centrifuge drive motor control arrangement. A supplemental charging current source is provided to assist the charging of the capacitor to the triggering signal level within a predetermined short delay time.

5 Claims, 4 Drawing Figures

AUTO-THRESHOLD SLOW START CONTROL CIRCUIT FOR A CENTRIFUGE

BACKGROUND OF THE INVENTION

This invention relates to a slow start control network for a centrifuge and, in particular, to an electronic circuit for imparting an exponential acceleration characteristic to a centrifuge rotor.

Zonal separations by centrifugation are achieved by first preparing a liquid density gradient in a stationary vertically disposed container which has a length which exceeds its diameter. A sample to be separated is layered on the top of the gradient within the container. The container is then centrifuged and the particles within the sample migrate under the influence of the centrifugal force field until they are suspended in that portion of the gradient which corresponds to their density. In order to properly effect a density gradient zonal separation care must be exercised during the start-up sequence which brings the centrifuge rotor from a stationary position up to running speed. If the rotor start-up sequence is too abrupt the possibility exists that the sample will be disrupted or inverted. This occurrence would negate the separation.

One technique utilized to control the start-up sequence of a centrifuge so that the sample layer is not disrupted includes lowering the initial voltage applied across the drive motor windings to some predetermined low percentage (e.g., fifteen percent) of the rated applied voltage to effect a slow start. This may prove disadvantageous over a long term due to the tendency of an oxide coating to form over the windings. This coating eventually builds to a resistance level that is, in effect, impervious to the low voltage signal. Thus, start-up of the drive motor is prevented.

Another expedient is exemplified by U.S. Pat. No. 4,142,138 (Taylor et al.), assigned to the assignee of the present invention, wherein a dual spring arrangement is provided. The dual spring arrangement includes a first spring element which initially provides a first, lower, force to urge the motor brushes into contact with the commutator. Thereafter, as rotor speed increases, an increased force is applied by a second, larger, spring to urge the brushes more forcefully into contact with the commutator.

The drive motor control arrangement for a centrifuge includes, in the typical case, a power control device, as a silicon controlled rectifier (SCR), connected in series with the rotor drive motor. A capacitor controls the threshold voltage applied to the SCR gate electrode. The SCR is gated on at earlier points during each half cycle of line current as the start-up sequence proceeds by increasing the charging current flow to the capacitor. Capacitor current flow is regulated by a variable resistor. By charging the capacitor to the SCR threshold voltage earlier in a half cycle of line current more energy is applied to the drive motor windings thus increasing motor speed.

The variable resistor may take the form of an opto-isolator arrangement which includes a light emitting diode (LED) and an associated photo-resistor. The resistance of the photo-resistor decreases as the intensity of light emitted from the LED is increased. Light intensity from the LED can be caused to increase by increasing the current flow through the LED. The LED current is normally controlled by a regulating bipolar transistor connected in series therewith. In order to overcome system hysteresis a manually adjustable thresholding network is provided so that a predetermined base current is drawn through the regulating bipolar transistor immediately upon start-up. This increases the intensity of the light emitted from the LED so that the variable resistance is reduced. Rotor motion begins in a relatively short time after power application. However, this manual adjustment is sometimes difficult to make.

Accordingly, it would be advantageous to provide a slow start control network which overcomes system hysteresis without the necessity of a difficult manual adjustment. Further, it would be advantageous to provide a control network which, upon detection of the initial current flow through the LED sufficient to overcome system hysteresis, thereafter causes LED current flow to gradually increase, preferably at an exponential rate, until operating speed is reached.

SUMMARY OF THE INVENTION

The instant invention relates to a slow start control network for use with the drive motor control arrangement for a centrifuge. The slow start control network of the instant invention includes a circuit element having an exponential transfer function, such as a field effect transistor, which produces a current output exponentially related to the input voltage applied to the control terminal thereof. The circuit element controls the current flow through the light emitting diode (LED) of an opto-isolator used in the drive motor control arrangement of the centrifuge.

In accordance with the instant invention the voltage across the control terminal of the circuit element is regulated by a charging capacitor. Means is provided for initially applying a supplemental charging current to bring the voltage across the capacitor to a predetermined value within a predetermined short period of time after the initiation of the slow start control network. Further in accordance with this invention, once current flow through the LED associated with the drive motor speed control arrangement is initiated means responsive to the occurrence of this current flow is provided for disabling the supplemental charging current source. Thereafter the current flow through the LED is permitted to gradually increase in accordance with the exponential transfer characteristic of the circuit element.

BRIEF DESCRIPTION OF THE DRAWINGS

The invention will be more fully understood from the following detailed description thereof taken in connection with the accompanying drawings which form a part of this application and in which.

DETAILED DESCRIPTION OF THE INVENTION

Figure 1:
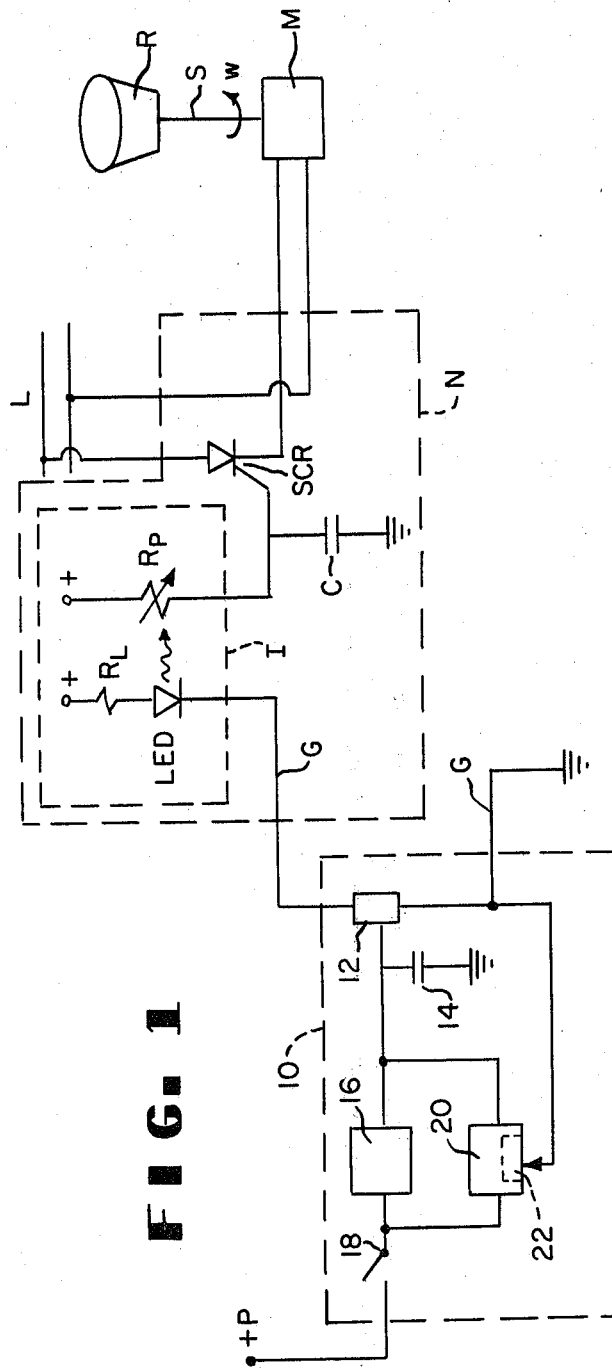
FIG. 1 is a generalized block diagram of the instant invention.

Throughout the following detailed description similar reference numerals refer to similar elements in all figures of the drawings.

With respect to FIG. 1 shown is a styllized block diagram of a centrifuge adapted to effect density gradient zonal separation. The centrifuge has a rotor element R mounted on a shaft S and adapted to be driven at a rotational speed w by an electric motor M.

The energy applied to the motor M from the line L, and hence the speed w of the rotor R, is governed by a drive motor speed control arrangement N. The speed control network N includes a silicon controlled rectifier SCR connected in series with the motor M. The SCR is controlled by a capacitor C. Charging current to the capacitor C is regulated by an opto-isolator I which includes a light responsive variable photo resistor $R_p$ and a light emitting diode LED.

Figure 4:
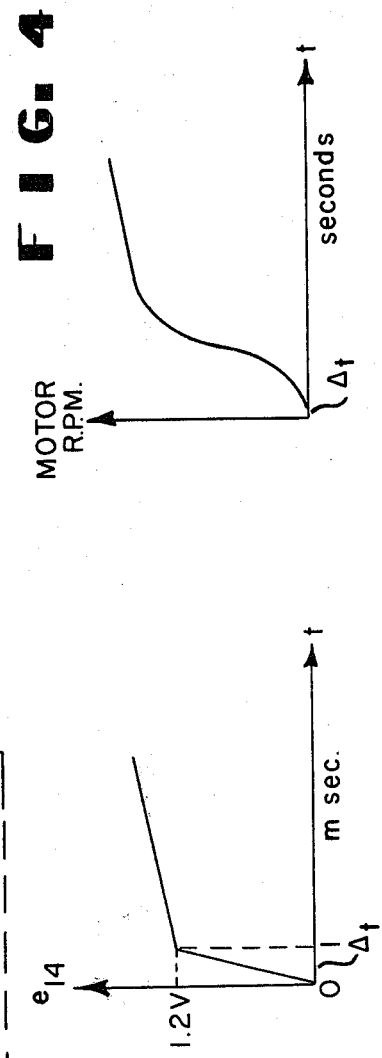
FIGS. 3 and 4 are, respectively, graphical representations of the timing capacitor voltage plotted against time and the speed of the centrifuge rotor plotted against time.

The LED is connected to a source of potential through a limiting resistor $R_L$. The cathode of the LED is connected to ground potential by a line G. Connected into the line G in series with the LED is a circuit element 12 which forms a part of the slow start control network 10 in accordance with the instant invention. The circuit element 12 is selected to provide an exponential transfer function and is thus able to provide an output current (which flows through the LED loop) that is exponentially related to the input voltage applied to the control terminal thereof. Suitable for use as the circuit element 12 is a field effect transistor such as that manufactured by Signetics Inc. and sold under model number VN10KM. Due to the nature of the element 12 the rotor speed characteristic (FIG. 4) that is exponential in nature is imparted to the rotor R during the start-up sequence. Of course, any other suitable square law transfer function devices, such as a bipolar transistor or other semiconductor device, may be utilized as the circuit element 12 in the slow start sequence control network 10 here described with its consequent effect on rotor speed. The field effect transistor is preferred due to its exponential transfer function at low current levels.

The input voltage to the control electrode of the circuit element 12 is derived from the voltage imposed across a charging capacitor 14. Charging current to the capacitor 14 is normally provided through a constant primary current source 16 connected through a switch 18 to a potential P. However, in order for the system's hysteresis to be overcome within a predetermined short time delay $\Delta t$ (e.g. 1 millisecond, FIG. 3) a supplemental charging current source 20 is connected in parallel to the primary current source 16. Shortly after initiation of the slow start sequence by manipulation of the switch 18 the supplemental charging current source 20 provides a charging current to the capacitor 14 sufficient to cause current flow through the LED loop and thereby modify the resistance of the variable resistor $R_p$ to an extent sufficient to permit rotor motion to begin.

The supplemental current source 20 includes means 22 for detecting the initial LED current flow (in the line G) and thereupon responds by terminating the supply of supplemental charging current. Thereafter the primary current source 16 supplies charging current to the capacitor 14 and the current flow through the circuit element 12 (and thus through the LED) increases at an exponential rate. In this manner a slow start control network is provided that provides initial current flow through the LED to overcome system hysteresis in a relatively short time and thereafter provides a smoothly rising exponential current to accelerate the centrifuge rotor to operating speed.

Figure 2:
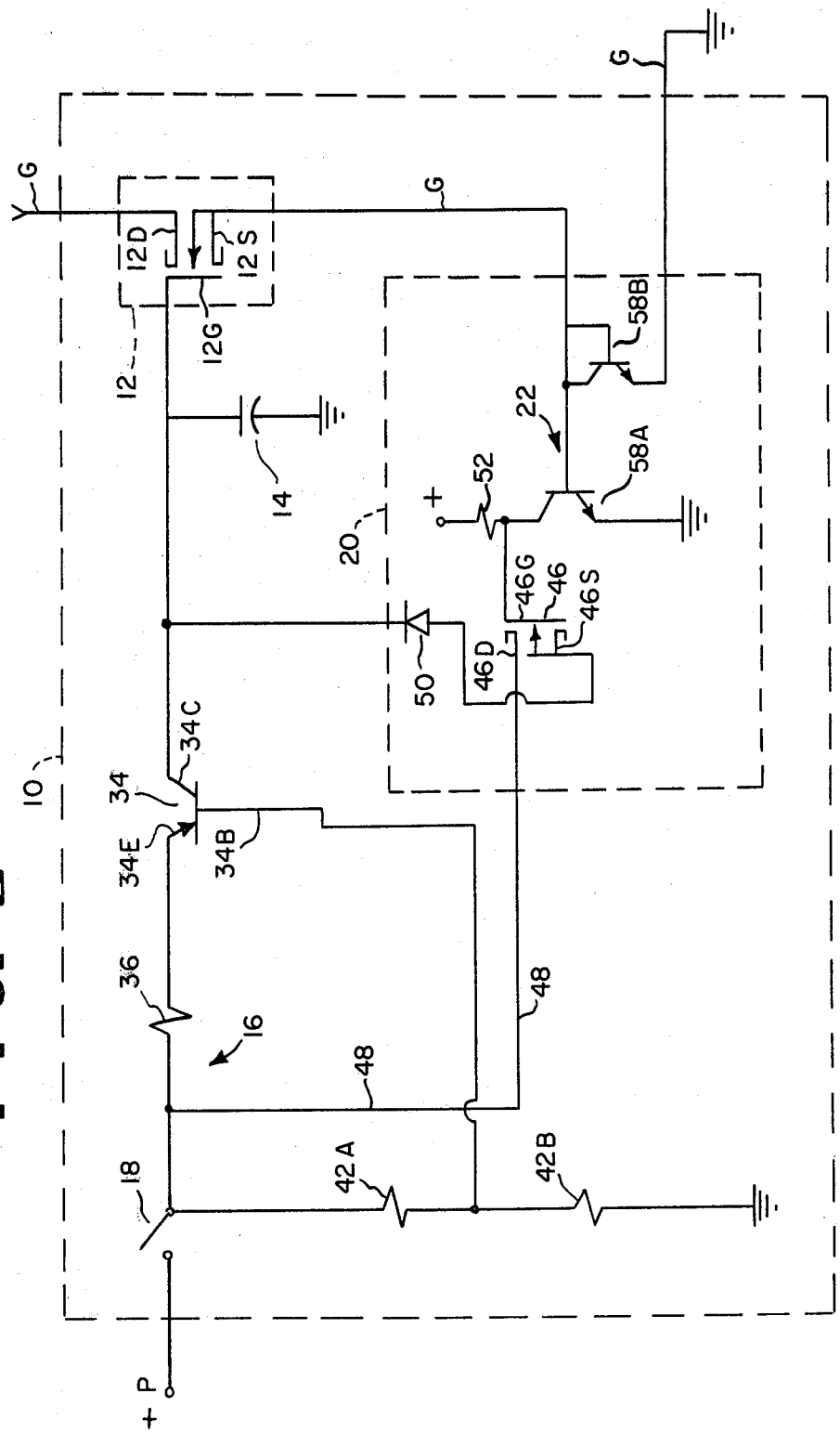
FIG. 2 is a schematic diagram of a slow start control network implementing the block diagram of FIG. 1.

With reference to FIG. 2 shown is a detailed schematic diagram of the slow start control network 10 in accordance with the instant invention. As discussed earlier the drive motor control N includes a light emitting diode LED. The cathode of the diode LED is connected by the line G to the drain 12D of the active circuit element 12, preferably a field effect transistor. The source terminal 12S of the element 12 is connected through the line G to ground potential.

The gate terminal 12G of the circuit element 12 is controlled and triggered by the voltage across the charging capacitor 14. The capacitor 14 is connected to the primary current source 16 and specifically to the collector terminal 34C of a transistor switch 34 of the PNP type included therein. The emitter 34E of the transistor 34 is connected through a fixed resistor 36 to one side of the switch 18. The same side of the switch 18 is connected through a pair of fixed resistors 42A and 42B to ground potential. The base terminal 34B of the switch 34 is connected at the mid-point of the resistor network 42. If the primary current source 16 is alone relied upon to provide a current sufficient to charge the capacitor 14 up to the threshold voltage of the field effect transistor 12 it is possible that it would take several minutes from the closure of the switch 18 to charge the capacitor 14 to that threshold. This time period is necessary to permit charging to overcome system hysteresis and is believed disadvantageous since, if uncorrected, it could be a potential source of customer dissatisfaction.

In accordance with the instant invention the supplemental charging current source 20 is provided. The supplemental charging current source includes a transistor switch 46 connectable by the switch 18 to the source of positive potential P. The switch 46 is preferably a field effect transistor identical to that utilized as the active circuit element 12. The drain electrode 46D of the switch 46 is connectable to the potential P on the line 48. The source electrode 46S of the field effect transistor switch 46 is connected through a diode 50 to the capacitor 14. The gate terminal 46G of the switch 46 is connected to a source of positive potential through a fixed resistor 52.

The means 22 is operatively associated with the supplemental current source and responsive to the flow of current through the circuit element 12 (and, thus, the LED loop) for disabling the supplemental current flow once a control current is initiated within the LED loop. The means 22 includes a pair of NPN transistors 58A and 58B. The cases of the transistors 58 are epoxied together for thermal tracking. This arrangement is provided for temperature stability and imparts a stable profile when time delay is plotted against temperature (not shown). The transistors 58 are connected in a current mirror configuration. The base terminal of the transistor 58A (and the collector of the transistor 58B) are connected to the source electrode of the field effect transistor 12 by the line G. The collector of the transistor 58A is tied to the low voltage side of the fixed resistor 52.

In operation, with the centrifuge having previously been in an off condition, the voltage across the capacitor 14 is at zero volts and the field effect transistor 12 has no current flowing therethrough. The transistor 34 is biased to an off condition as are the transistors 58A and 58B. However, the transistor 46 is biased to a conducting state due to the presence of the positive potential on the gate electrode 46G thereof. Of course, no current flows through the transistor switch 46 since the drain electrode 46D and the source electrode 46S are both at the same potential with respect to each other.

Figure 3:

When the timer switch 18 is thrown the transistor 34 is turned on and the primary charging current flows from the potential source P to charge the capacitor 14. In response to the closure of the switch 18 a supplemental charging current flows from the source P through the low impedance path including the field effect transistor 46 and the diode 50. The supplemental charging current assists in the charging of the capacitor 14 to the threshold voltage of the circuit element transistor 12. The waveform of the capacitor voltage $e_{14}$ as plotted against time is shown in FIG. 3. It should be noted that the capacitor voltage reaches a level (approximately 1.2 v) sufficient to turn on the circuit element 12 in a short delay time $\Delta t$, approximately 1 millisecond.

Once current flow through the circuit element 12 is initiated this current flow is sensed at the base of the transistor 58A. The transistor 58A turns on bringing the collector thereof to ground potential to cut off the field effect transistor 46. This has the effect of interrupting the supplemental current flow. Thus, in accordance with the instant invention when the voltage across the capacitor 14 reaches the threshold for the field effect transistor 12 a motor control current flows in the LED loop. The means 22 is responsive to the LED current flow and becomes operative to disable and disconnect the supplemental current source.

In summary, a supplemental current source in response to the initiation of the primary charging current is provided to supplement charging current to the capacitor 14. Thus the capacitor 14 is brought to a predetermined threshold voltage (sufficient to gate on the circuit element 12) within a predetermined short period of time. Thereafter, due to the particular transfer function of the element 12, a predetermined (here exponential) current waveform flows through the LED to thereby vary the resistance of the variable photoresistor in the drive motor speed control network. As soon as a current flow is achieved through the LED loop, the switch 58A turns on, disabling the supplemental current source and returning the continued charge rate of the capacitor 14 to the influence of the primary charging current source.

Those skilled in the art having benefits of the teaching of the instant invention may effect numerous modifications thereto. Such modifications are to be construed as lying within the contemplation of the instant invention as defined in the instant claims.

What is claimed is:

1. A slow start control network for use with a drive motor control arrangement for a centrifuge comprising:
   a circuit element having a predetermined transfer function connectable to the drive motor control arrangement;
   a charging capacitor adapted to apply a predetermined triggering signal to the circuit element to trigger the same and initiate current flow through the drive motor control arrangement;
   a primary current source for charging the capacitor;
   a supplemental current source for providing a supplemental current to the capacitor to assist the charging of the capacitor; and
   means responsive to the flow of current through the drive motor control arrangement to disconnect the supplemental current source from the capacitor.

2. The centrifuge according to claim 1 wherein the circuit element has an exponential transfer function.

3. The centrifuge according to claim 2 wherein the circuit element is a field effect transistor.

4. The centrifuge of claims 1 or 2 wherein the disconnect means includes a transistor responsive to the flow of control current in the drive motor control arrangement to disconnect the supplemental source from the capacitor.

5. The centrifuge of claims 1 or 2 wherein the disconnect means includes a first and a second transistor connected as a current mirror and responsive to the flow of control current in the portion of the drive motor speed control to disconnect the supplemental source from the capacitor.

* * * * *